(12) United States Patent
Dolezalek

(10) Patent No.: US 12,135,369 B2
(45) Date of Patent: Nov. 5, 2024

(54) DISTANCE SENSING AND VISUAL INDICATOR ARRAYS WITH RECONFIGURABLE DETECTION WINDOWS

(71) Applicant: Banner Engineering Corp., Minneapolis, MN (US)

(72) Inventor: Charles Dolezalek, Stacy, MN (US)

(73) Assignee: BANNER ENGINEERING CORP., Minneapolis, MN (US)

(*) Notice: Subject to any disclaimer, the term of this patent is extended or adjusted under 35 U.S.C. 154(b) by 879 days.

(21) Appl. No.: 17/153,691

(22) Filed: Jan. 20, 2021

(65) Prior Publication Data

US 2022/0229180 A1    Jul. 21, 2022

(51) Int. Cl.
*G01S 17/08*    (2006.01)
*G06Q 10/087*    (2023.01)
*G09B 5/00*    (2006.01)

(52) U.S. Cl.
CPC ............ *G01S 17/08* (2013.01); *G06Q 10/087* (2013.01); *G09B 5/00* (2013.01)

(58) Field of Classification Search
None
See application file for complete search history.

(56) References Cited

U.S. PATENT DOCUMENTS 7,077,318 B2    7/2006    Venema et al.
8,780,068 B2    7/2014    Lin 8,817,076 B2 *   8/2014   Steen .................. G06T 19/20
                                                 345/158
9,229,597 B2    1/2016    Oraw
(Continued)

FOREIGN PATENT DOCUMENTS

JP    2020139938 A    9/2020
WO   2019172753 A1    9/2019

OTHER PUBLICATIONS

International Search Report and Written Opinion of the International Searching Authority in related international patent application serial No. PCT/US2022/070108, Apr. 4, 2022, 16 pages.
(Continued)

*Primary Examiner* — Hovhannes Baghdasaryan
(74) *Attorney, Agent, or Firm* — Thompson Patent Law Offices PC

(57) ABSTRACT

Apparatus and associated methods relate to an array of individually readable distance sensors disposed along a first axis on a platform and configurable to detect penetration of a first plane containing the first axis, and an array of individually controllable light emitting indicators disposed on the platform along at least a second axis and configurable to emit visual indicia to a user out of the first plane. The visual indicia may, for example, be associated with the detected penetration. A reconfigurable predetermined detection window may, for example, be generated by associating adjacent sensors detecting input during a teaching operation. The detection window may, for example, be further generated by determining at least one distance threshold profile as a function of input received from the adjacent sensors during the teaching operation. Various embodiments may advantageously enable efficient configuration of generic sensing and indication units.

18 Claims, 7 Drawing Sheets

(56) References Cited

U.S. PATENT DOCUMENTS

| | | | |
|---|---|---|---|
| 10,146,321 B1* | 12/2018 | Knas | G06F 3/017 |
| 10,831,431 B2 | 11/2020 | Nel | |
| 11,300,662 B1* | 4/2022 | Milton | G01S 17/06 |
| 2004/0247421 A1 | 12/2004 | Saunders et al. | |
| 2006/0161871 A1* | 7/2006 | Hotelling | G06F 3/0485 |
| | | | 715/862 |
| 2007/0121097 A1* | 5/2007 | Boillot | G01S 15/104 |
| | | | 356/28 |
| 2007/0125633 A1* | 6/2007 | Boillot | G06F 3/011 |
| | | | 361/139 |
| 2010/0097346 A1 | 4/2010 | Sleeman | |
| 2011/0090147 A1* | 4/2011 | Gervais | G06F 3/017 |
| | | | 345/157 |
| 2011/0298579 A1 | 12/2011 | Hardegger et al. | |
| 2012/0001875 A1* | 1/2012 | Li | G06F 3/017 |
| | | | 345/177 |
| 2012/0095575 A1 | 4/2012 | Meinherz et al. | |
| 2016/0124080 A1* | 5/2016 | Carter | G06F 3/016 |
| | | | 367/95 |
| 2016/0218257 A1 | 7/2016 | Ray et al. | |
| 2017/0015502 A1 | 1/2017 | Engel et al. | |
| 2021/0048970 A1* | 2/2021 | Nel | G09F 3/204 |

OTHER PUBLICATIONS

Microsonoic, "Everything Ultrasonic," Feb. 24, 2016, retrieved from the internet, <http://www.microsonic.de/DWD/_111327/pdf/1033/microsonic_mic+.pdf>.

Banner Engineering Corp., Linear Array Lights, Oct. 22, 2020, <https://www.bannerengineering.com/us/en/products/accessories/vision-lighting/linear-array-lights.html>.

Banner Engineering Corp., PVL Series Parts Verification Pick-to-Light Arrays, Oct. 22, 2020, <https://www.bannerengineering.com/us/en/products/lighting-and-indicators/pick-to-light/partsverification-arrays-pvl-series.html>.

GPIO Solutions GmbH, LogiMAT 2018 Fair Report. GPIO Solutions, 2018, <https://www.gpiosolutions.com/en/news/logimat-2018-fair-report>.

GPIO Solutions GmbH, Multi Order Picking by LED Strips. GPIO Solutions, 2019, <https://www.gpio-solutions.com/en/news/multi-order-picking-by-led-strips>.

mindsensors.com, Light Sensor Array for NXT or EV3, 2016, <http://www.mindsensors.com/ev3-andnxt/47-light-sensor-array-for-nxt-or-ev3>.

mindsensors.com, LightSensorArray User Guide; Manual; 2016, http://www.mindsensors.com/pdfs/LightSensorArray-User-Guide.pdf; MindSensors.com, 2016, <http://www.mindsensors.com/pdfs/LightSensorArray-User-Guide.pdf>.

Corrected Replacement Claims in response to Informal Communications, filed Oct. 13, 2022, in related International patent application serial No. PCT/US2022/070108, Apr. 4, 2022, 6 pages.

Response to Informal Communications filed Sep. 26, 2022, in related international patent application serial No. PCT/US2022/070108, Apr. 4, 2022, 19 pages.

Notice of Informal Communication mailed Jul. 26, 2022, in related international patent application serial No. PCT/US2022/070108, Apr. 4, 2022, 3 pages.

* cited by examiner

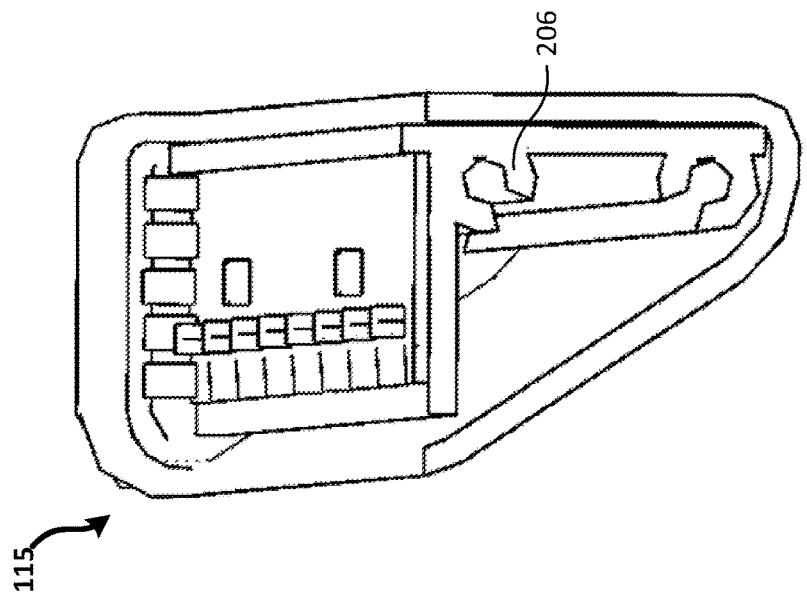
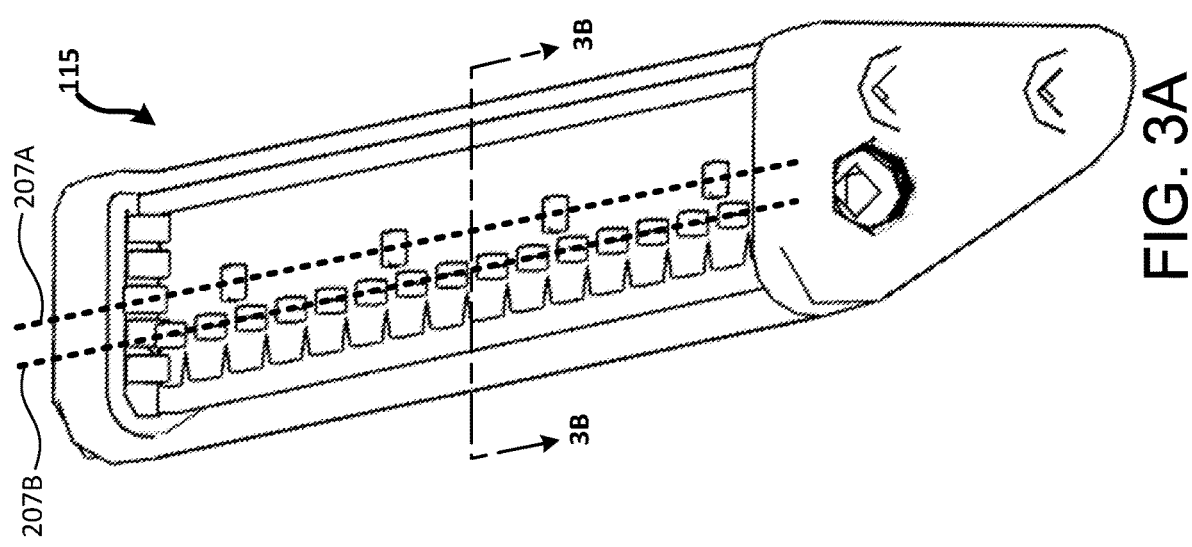
FIG. 3B
FIG. 3A

DISTANCE SENSING AND VISUAL INDICATOR ARRAYS WITH RECONFIGURABLE DETECTION WINDOWS

TECHNICAL FIELD

Various embodiments relate generally to sensing and indication.

BACKGROUND

Various items may be placed in individual containers such as, for example, assembly, shipping, warehousing, and/or order picking. Items may include, by way of example and not limitation, components, repair parts, and/or finished products. Users may select a predetermined number of items from an assortment of different containers.

Light units may be placed on or about various containers to guide a user in selecting items from various containers in a predetermined sequence. Indicator units may, for example, guide a user in a quantity of a given item to select. Sensing units may, for example, detect when a user interacts with a particular container. Controllers may, for example, operate a predetermined sequence of sensing and indication associated with a plurality of containers.

SUMMARY

Apparatus and associated methods relate to an array of individually readable distance sensors disposed along a first axis on a platform and configurable to detect penetration of a first plane containing the first axis, and an array of individually controllable light emitting indicators disposed on the platform along at least a second axis and configurable to emit visual indicia to a user out of the first plane. The visual indicia may, for example, be associated with the detected penetration. A reconfigurable predetermined detection window may, for example, be generated by associating adjacent sensors detecting input during a teaching operation. The detection window may, for example, be further generated by determining at least one distance threshold profile as a function of input received from the adjacent sensors during the teaching operation. Various embodiments may advantageously enable efficient configuration of generic sensing and indication units.

Various embodiments may achieve one or more advantages. For example, some embodiments may advantageously enable generic sensing and indication units to be deployed, configured, and/or reconfigured quickly and efficiently. In various embodiments, a detection and indication system may be configured or reconfigured without the need for coding. For example, various embodiments may advantageously enable rapid configuration of detection and/or indication of a predetermined sequence of picking and/or placement operations. In various embodiments, the need for physical reconfiguration, remounting, and/or rewiring of indicators and/or sensors may be advantageously reduced or eliminated. In various embodiments, sensing and indication units may advantageously be virtually and reconfigurably provided with one or more reconfigurable predetermined detection windows defining discrete areas of penetration detection. In various embodiments, sensing and indication units may advantageously be divided into one or more associated visual indication subunits and configured to generate one or more visual indicia upon predetermined detection events associated with specific reconfigurable predetermined detection windows.

The details of various embodiments are set forth in the accompanying drawings and the description below. Other features and advantages will be apparent from the description and drawings, and from the claims.

BRIEF DESCRIPTION OF THE DRAWINGS

FIG. 3A depicts the exemplary distance sensing and visual indication system of FIG. 2 from a right end perspective view.

FIG. 3B depicts a cross-section view of the system depicted in FIG. 3A.

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a distance sensing and visual indication system 100 is introduced with reference to FIG. 1. Second, that introduction leads into a description with reference to FIGS. 2-3B of an exemplary embodiment of a distance sensing and visual indication system. Third, with reference to FIG. 4, an exemplary electrical configuration of an exemplary distance sensing and visual indication system is discussed. Fourth, with reference to FIGS. 5-7, the discussion turns to an exemplary method illustrating generation of a reconfigurable predetermined detection window. Finally, the document discusses further embodiments, exemplary applications and aspects relating to distance sensing and visual indication systems and related methods.

Figure 1:
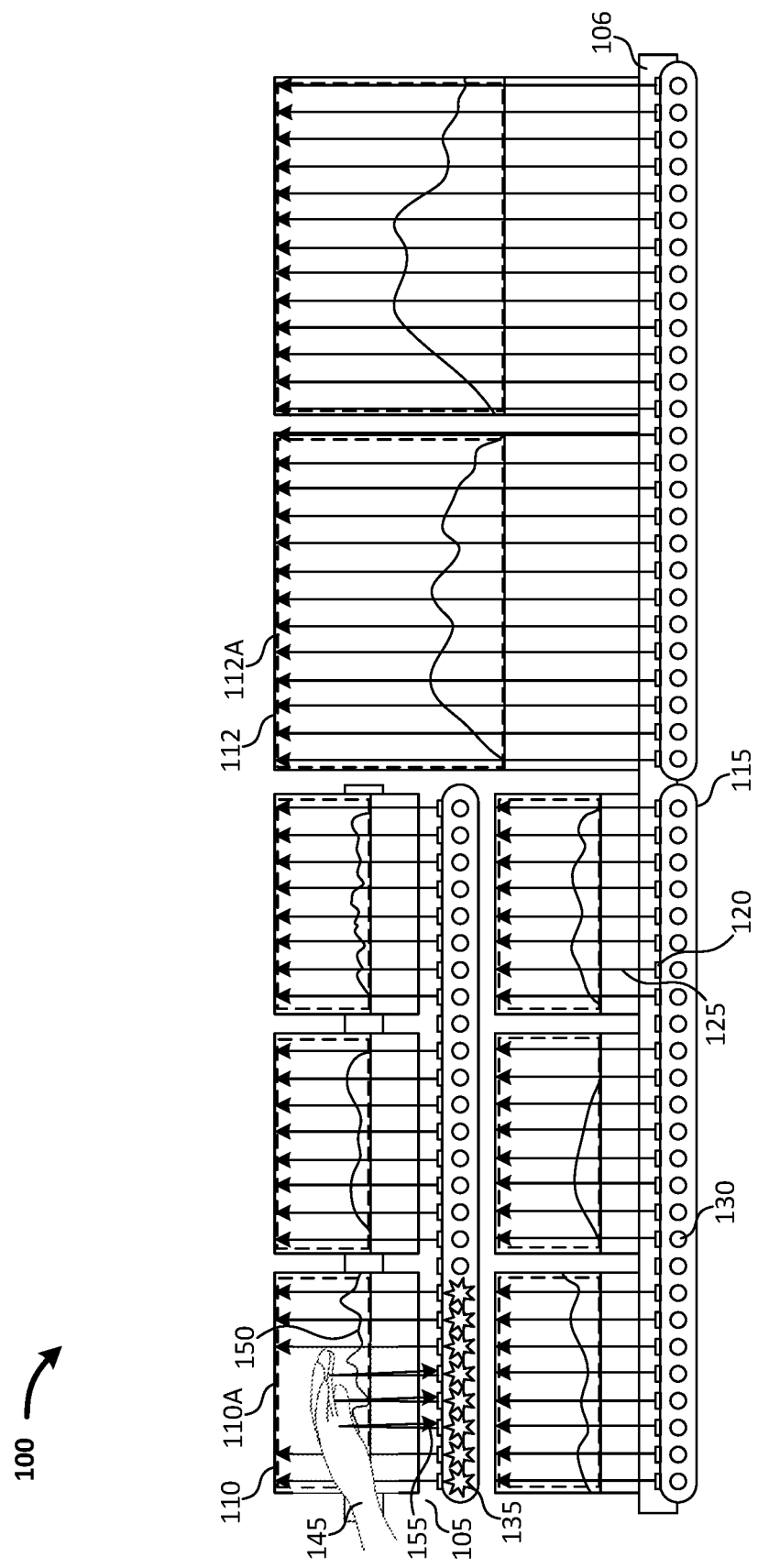
FIG. 1 depicts an exemplary distance sensing and visual indication system employed in an illustrative pick-to-light use-case scenario.

FIG. 1 depicts an exemplary distance sensing and visual indication system employed in an illustrative pick-to-light use-case scenario. An upper shelf 105 and lower shelf 106 are provided. A plurality of small containers 110 are disposed on the upper shelf 105. A second plurality of the smaller containers 110 and a plurality of larger containers 112 are disposed on the lower shelf 106. A plurality of distance sensing and visual indication (DSVI) units 115 are releasably coupled to the shelves 105 and 106.

Each DSVI unit 115 is provided with a first array of individually readable distance sensing elements 120 configured to emit corresponding electromagnetic signals 125 and detect reflection thereof. Each DSVI unit 115 is further provided with a second array of individually controllable visual indicators 130, configured to emit visual indicia 135 in response to predetermined events. One or more control circuits (not shown) are provided and configured to define reconfigurable predetermined detection windows (RPDWs) by associating adjacent distance sensing elements 120 and associating a corresponding sensor threshold profile. In the depicted embodiment, the DSVI units 115 are configured with a plurality of RPDWs 110A corresponding to each small container 110, and a plurality of RPDWs 112A corresponding to each large container 112.

The system 100 may advantageously detect penetration of one of the RPDW (e.g., 110A, 112A) by an object such as a hand 145. The system 100 may further activate one or more associated visual indicators 130 to generate predetermined visual indicia 135. By way of example and not limitation, the DSVI units 115 may be configured onto the shelves 105 and 106 as a pick-to-light (or put-to-light) system. As depicted, a user reaches their hand 145 into one of the bins 110 to access bin contents 150. As the user's hand 145 enters the bin 110, the user's hand 145 penetrates the corresponding RPDW 110A. The user's hand 145 penetrating the RPDW 110A causes the electromagnetic signals 125 emitted by distance sensing elements 120 to be at least partially reflected. Resulting reflected electromagnetic signals 155 are received by the distance sensing elements 120. The corresponding DSVI unit 115 thereby detects penetration of the corresponding RPDW 110A.

Accordingly, visual indicia 135 may be generated, terminated, and/or modified accordingly such as, for example, by terminating visual indicia 135 under the bin 110A upon detecting that a user has picked a part therefrom. Generic DSVI units 115 may be disposed on shelves 105 and 106, and discrete sensing regions may be defined by generation of the various RPDWs 110A and 112A, corresponding to matching openings of bins 110 and 112, respectively. Predetermined width and height threshold profiles of the RPDWs 110A and 112A may advantageously restrict detection of penetration within a desired area. For example, in the depicted scenario, the RPDWs 110A prevent the left DSVI unit 115 on the lower shelf 106 from detecting the hand 145 while it is entering the bin 110 on the upper shelf 105.

Furthermore, RPDWs may advantageously enable one or more generic DSVI units 115 to be placed in desired locations, which may span multiple desired sensing areas. The RPDWs 110A and 112A may be advantageously configured and/or reconfigured to activate and/or deactivate sensors 120 (e.g., activating sensors 120 corresponding with the upper left bin 110 and the adjacent bin 110, but deactivating a sensor 120 between them), associate sensors 120 together to create discrete sensing windows, associate adjacent sensing elements with a sensing distance profile(s), or some combination thereof. In various embodiments, visual indicators 130 may be associated together to create discrete visual indicator groups. Visual indicator groups may, for example, be associated with predetermined penetration events of one or more RPDWs. Accordingly, generic DSVI units may be advantageously deployed, configured, and reconfigured quickly and efficiently. In various embodiments, the need for physical reconfiguration, remounting, and/or rewiring of indicators and/or sensor may be advantageously reduced or eliminated.

Figure 2:
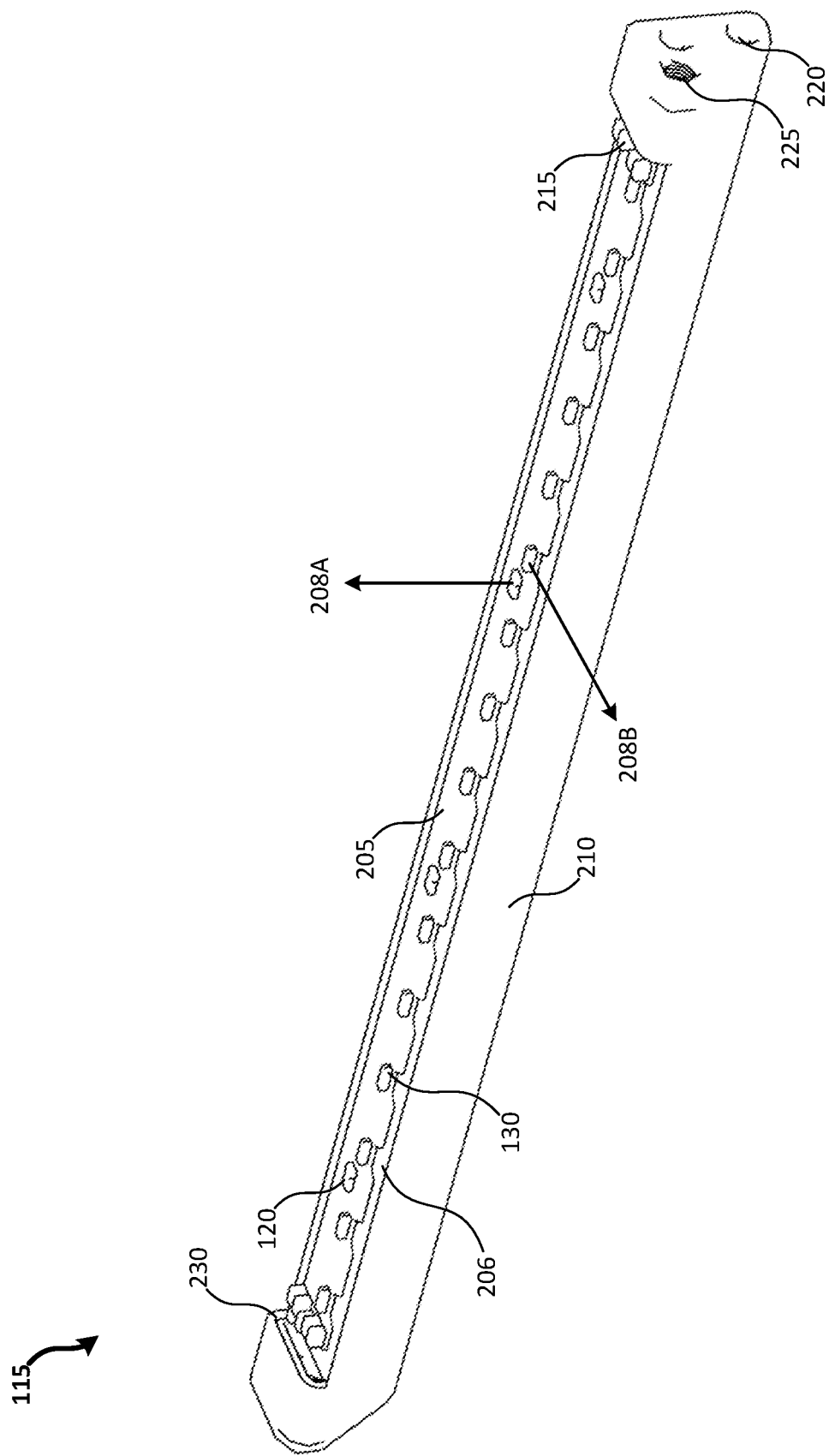
FIG. 2 depicts an exemplary distance sensing and visual indication system in a self-contained unit.

FIG. 2 depicts an exemplary distance sensing and visual indication system in a self-contained unit. FIG. 3A depicts the exemplary distance sensing and visual indication system of FIG. 2 from a right end perspective view. FIG. 3B depicts a cross-section view of the system depicted in FIG. 3A. A platform 205 is provided on which are mounted a first array of sensing elements 120 and a second array of light emitting visual indicators 130. In the depicted embodiment, the first array of sensing elements 120 is disposed along a first axis 207. The second array of visual indicators 130 is disposed along a second axis 208. As depicted, the first axis 207A and the second axis 207B are parallel. The sensor elements 120 are configured to emit the corresponding electromagnetic signals in a first plane defined by the first axis 207A and a sensing axis 208A. The visual indicators 130 are configured to emit visual indicia at least in a second plane defined by the second axis 208A and an indicating axis 208B. In various embodiments, the sensing axis 208A and the indicating axis 208B may be perpendicular to each other.

Additional circuit elements 215 are disposed on the platform 205. The platform 205 may, for example, be a printed circuit board (PCB). The platform 205 is disposed on a mounting structure 206. The mounting structure 206 may, for example, be a linear extrusion. The linear extrusion may, for example, be aluminum and may advantageously function as a heat sink to transfer heat from the sensing elements 120, indicators 130, platform 205, adjacent heat sources, other associated elements, or some combination thereof.

In the depicted embodiment, the mounting structure 206 is disposed within a housing 210. The housing 210 is provided at a first end and a second end (not shown) with coupling elements 220 and electrical coupling element 225. The depicted pair of coupling elements 220 on the first end may, by way of example and not limitation, be screws, rivets, adhesive point, weld point (e.g., plastic welding), other appropriate fastener, or some combination thereof. The coupling elements 220 may, for example, couple the housing to the mounting structure 206. The electrical coupling element 225 may, for example, be configured to releasably couple an electrical coupling element into electrical communication with the sensing elements 120 and the visual indicators 130. The electrical coupler may, for example, be a commercially available electrical coupler. In various embodiments, multiple DSVIs 115 may be connected in series (e.g., "daisy-chained").

In the depicted embodiment, the housing 210 is provided with integrated first and second lens attachment features 230. The lens attachment features 230 may, for example, be configured to releasably receive and couple to a separate lens element (not shown). In various embodiments, the lens attachment features 230 may, for example, be omitted. In various embodiments, a lens element may, for example, be integrated into the housing 210. The housing 210 may, for example, be formed as a co-extrusion having one or more lens elements formed therein. The lens element may, by way of example and not limitation, be at least partially transparent. The housing 210 and lens elements may be configured to advantageously permit desired electromagnetic signals to be emitted from and reflected back to the sensing elements 205 at least in the first plane, as well as to allow visual indicia to be emitted from and visually discernible to a user at least in the second plane.

As depicted, the arrays of sensing elements 120 and visual indicators 130 are 1D (linear). In various embodiments, by way of example and not limitation, arrays of sensing elements and/or visual indicators may be 2D (e.g., a planar area) or 3D (e.g., a three-dimensional curvilinear surface). The visual indicators 130 may, by way of example and not limitation, include LEDs. The sensing elements 120 may, by way of example and not limitation, include time of flight (e.g., laser) sensing, photoelectric sensing, capacitive touch sensing, ultrasonic sensing, or some combination thereof.

In various embodiments, the DSVI units 115 sensors may, by way of example and not limitation, be available in predetermined lengths, and/or configurations (e.g., curved, 2D, 3D). A single unit may be coupled to a shelving unit, and the length of a single unit may, for example, span one or multiple bins of parts in various configurations. Accordingly, DSVI units 115 may advantageously be virtually and reconfigurably provided with one or more RPDWs defining discrete detection windows. Furthermore, DSVI units 115 may advantageously be divided into one or more associated visual indication subunits and configured to generate one or more visual indicia upon predetermined detection events by the RPDWs.

For example, a single DSVI unit (e.g., DSVI unit 115, described at least in relation to FIGS. 1-6) may be virtually and reconfigurable divided into a plurality of discrete sensing and/or visual indication subunits. Each subunit may, for example, corresponding to a specific target region (e.g., a parts bin such as 110 or 112 of FIG. 1). Each subunit can be independently illuminated to, by way of example and not limitation, advantageously indicate to an operator which bin to pick from or put to. The integrated sensing elements may be configured to detect penetration in a first plane (e.g., penetration of a first plane by a user's hand). The sensing device may be further configured to detect penetration in the first plane only within a predetermined detection range (e.g., height) when the operator picks the parts from the bin.

Together, the virtual segmentation (associating adjacent sensors together) and the predetermined detection range of the associated sensors may define a reconfigurable predetermined detection window (e.g., height and width), or RPDW (e.g., RPDWs 110A and 112A in FIG. 1) in the penetration plane. The detection range and association of sensor adjustment may be repeatedly reconfigured to correspond to different bin setups. Accordingly, the DSVI unit may be advantageously installed once, and quickly and efficiently reconfigured for different bin configurations, as necessary.

Figure 4:
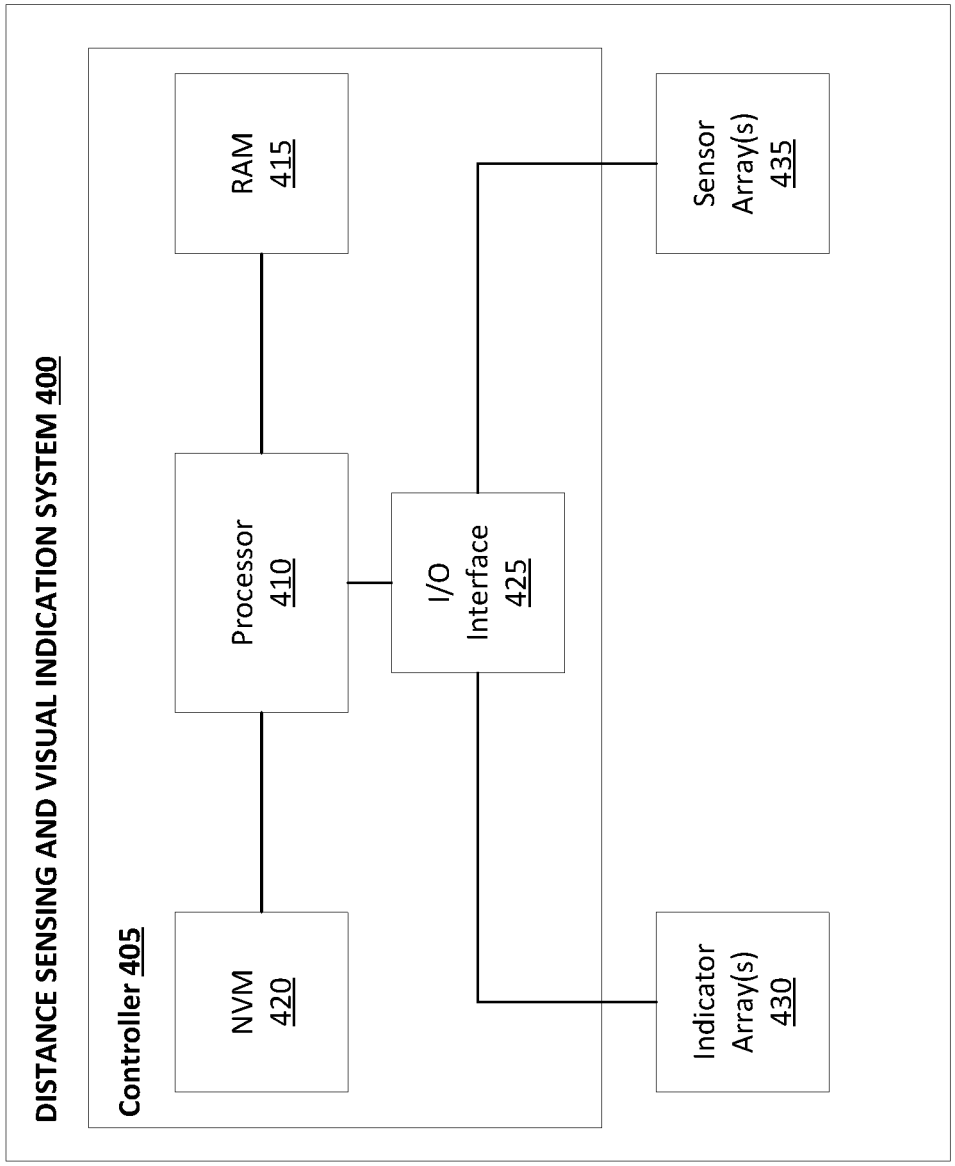
FIG. 4 depicts an exemplary block diagram of an exemplary distance sensing and visual indication system.

FIG. 4 depicts an exemplary block diagram of an exemplary distance sensing and visual indication system. The DSVI system 400 includes a controller 405. The controller 405 includes a processor 410, a memory module 415 (e.g., random access memory), a data store 420 (e.g., non-volatile memory), and an input/output (I/O) interface 435 (e.g., serial communication controller). The I/O interface 420 connects the indicator array(s) 425 and the sensor array(s) 430 to the controller 405 via the processor 410. In various embodiments, the controller 405 may, by way of example and not limitation, be integrated within a single DSVI unit (e.g., 115 of FIGS. 1-3), be connected to a plurality of DSVI units, be remotely connected, or some combination thereof.

For example, in various embodiments, a DSVI unit may be provided with an on-board controller may be loaded with a predetermined program of instructions defining one or more RPDWs (e.g., 110A and 112A of FIGS. 1-3), defining one or more visual indicator sets (e.g., groups of visual indicators 130 of FIGS. 1-3), defining predetermined detection events, associating one or more predetermined detection events with one or more visual indication events for one or more of the visual indicator sets, or some combination thereof. A separate controller(s) may, for example, communicate with one or more on-board controllers to coordinate detection events and/or visual indication events, to generate RPDWs, generate visual indicator sets, generate rules for predetermined detection events and/or predetermined visual indication events, generate associations between events and sensing elements and/or visual indicators, or some combination thereof.

A specific controller 405 may, for example, be configured to monitor feedback from sensing elements in the sensor array(s) 435 to detect when an operator's hand enters a specific bin. The controller 405 may then, for example, operate an associated set of indicators in the indicator array(s) 430 according, for example, to a predetermined visual indication event. For example, the controller 405 may operate the indicators, by way of example and not limitation, to turn off lights, blink lights, change colors, or some combination thereof. The visual indication event may, for example, advantageously acknowledge that the operator picked the parts from that bin (or put the parts to the bin) and that the operation can now move on to the next bin.

In various embodiments, a visual indicator array(s) 430 may be configured, for example, to indicate to the operator how many parts to select from a bin. For example, the controller 405 may operate one or more of the indicators in the array 430 to illuminate which bin to select from with one color of visual indicia, and to use another color of visual indicia to signify how many parts to pick. The controller 405 may, for example, indicate a pick (or put) count, for example, by short flashing bursts such as, by way of example and not limitation: one flash=1 part, double flash=2 parts, and so on. Accordingly, generic DSVI units may advantageously be virtually and reconfigurably configured with user-determined RPDWs and associated visual indicia to efficiently guide a user through a stepwise process.

Figure 5:
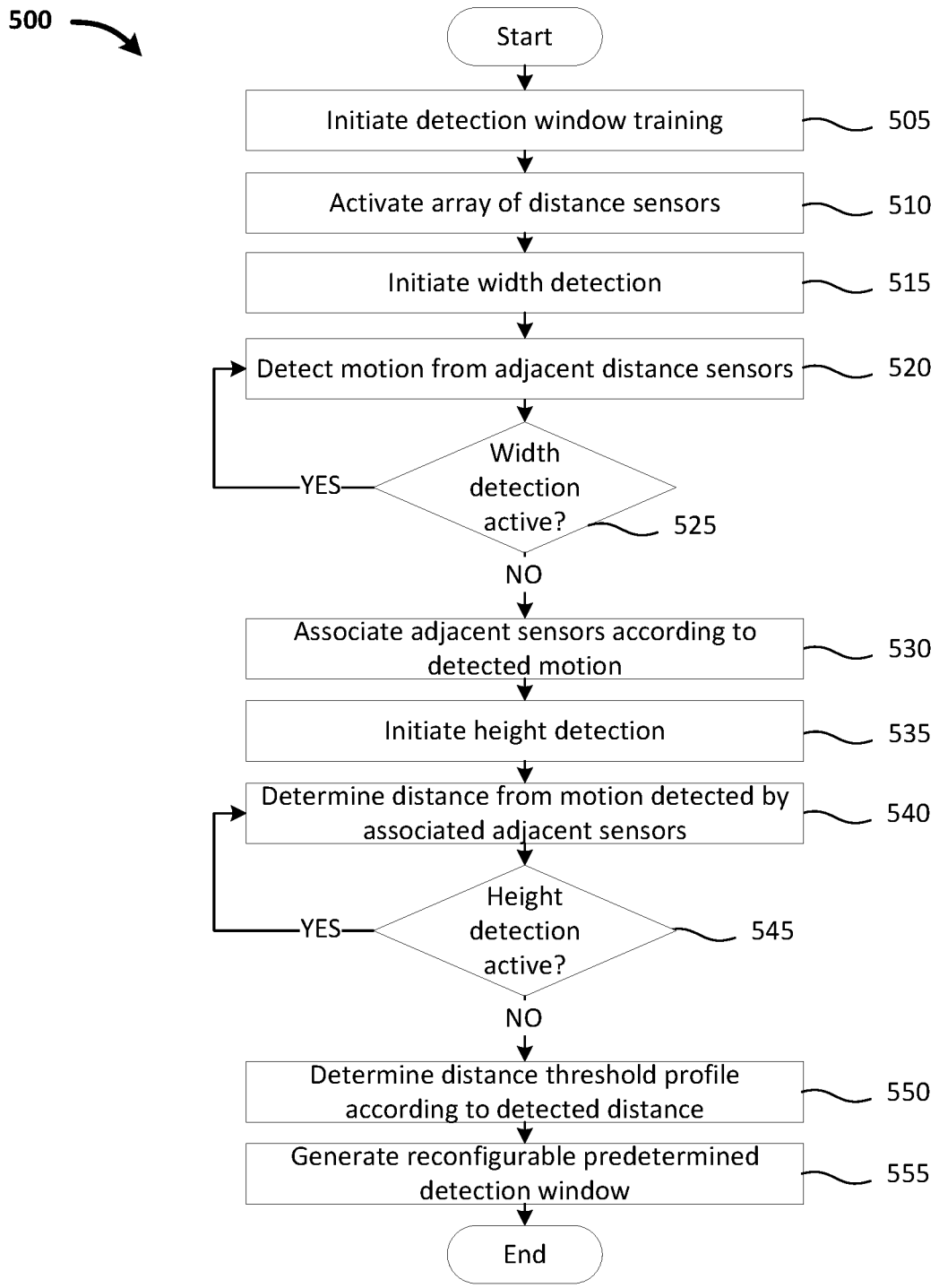
FIG. 5 depicts an exemplary method of generating a reconfigurable predetermined detection window.

FIG. 5 depicts an exemplary method of generating a reconfigurable predetermined detection window. The RPDW generation method 500 begins with initiation 505 of RPDW training. For example, a controller (e.g., 405 in FIG. 4) may receive a training initiation input signal from a user (e.g., via a physical button, software command, and/or other appropriate input). An array of distance sensors (e.g., the first array of distance sensing elements 120 in FIGS. 1-3) are then activated 510. For example, the individual distance sensors may be individually operated by the controller to simultaneously emit an electromagnetic signal and to detect reflected signals, if any.

Once the array of distance sensors is activated, width detection is initiated 515. Feedback from the distance sensors is monitored to detect motion 520. Motion may, for example, correspond to a user moving their hand across a sensing plane of a discrete number of adjacent sensors. If the width detection mode remains active 525, then the distance sensors continue to be monitored 520. Once the width detection mode is determined to no longer be active 525, adjacent distance sensor for which motion was detected are associated together 530. For example, the width detection mode may be ended by input from a user after the user has moved their hand across a desired number of adjacent sensors (e.g., corresponding to a single bin). The adjacent sensor may, for example, correspond to the width of a single bin or other desired discrete sensing region. The adjacent sensors may, by way of example and not limitation, be associated by storing unique sensor element IDs in a database or other storage structure in a controller (e.g., on-board, remote), configuring each sensor element with a unique ID generated to correspond to a specific RPDW, other appropriate virtual association, or some combination thereof.

Once width detection is completed by association of the adjacent sensors 530, height detection is initiated 535. By way of example and not limitation, height detection may be initiated automatically, or may be initiated upon receiving an appropriate input from a user. The distance sensors associated together during width detection are monitored for detected motion. By way of example and not limitation, the motion may be from a user moving their hand to a minimum distance (e.g., corresponding to a bottom of a bin opening), moving their hand to a maximum distance (e.g., corresponding to a top of a bin), moving their hand along a curvilinear path (e.g., corresponding to a non-linear detection border), or some combination thereof. The associated distance sensors continue to be monitored for motion until the height detection is determined 545 to no longer be active. For example, height detection may be ended by input from a user (e.g., corresponding to completion of a hand gesture indicative of height).

Once height detection monitoring is ended, a distance threshold profile is determined according to the distance data received from the associated distance sensors in step 540. In an exemplary linear mode (e.g., for generating a rectangular RPDW), for example, the distance threshold profile may be determined as a single distance or distance range. For example, a maximum height may be determined corresponding to a maximum distance at which motion is detected. A distance range may be determined, for example, corresponding to a minimum distance and maximum distance at which motion is detected (e.g., corresponding to a bin opening above the position of the sensing elements). In various embodiments, a distance threshold profile may include a profile of distances corresponding to one or more of the predetermined associated distance sensors (e.g., corresponding to a curvilinear boundary which a user swept their hand across).

Once the distance threshold profile is determined 550, a RPDW is generated 555. The RPDW is defined by the association of adjacent sensors performed in step 530 and the distance threshold profile determined in step 550. By way of example and not limitation, the RPDW may define a predetermined 2D or 3D 'window' which may be monitored for penetration. The RPDW may, for example, correspond to a specific opening(s) in a container(s). The RPDW may correspond, for example, to a portion of a DSVI unit (e.g., 115 in FIGS. 1-3), to an entire DSVI unit, or to more than a single DSVI unit. Accordingly, the method 500 may advantageously enable generic DSVI units to be efficiently and cost-effectively configured for a particular use. For example, parts may be rearranged, bins may be replaced, shelves rearranged, and/or other reconfiguration effected, and a teaching session may be performed to quickly configure corresponding RPDWs.

Figure 6:
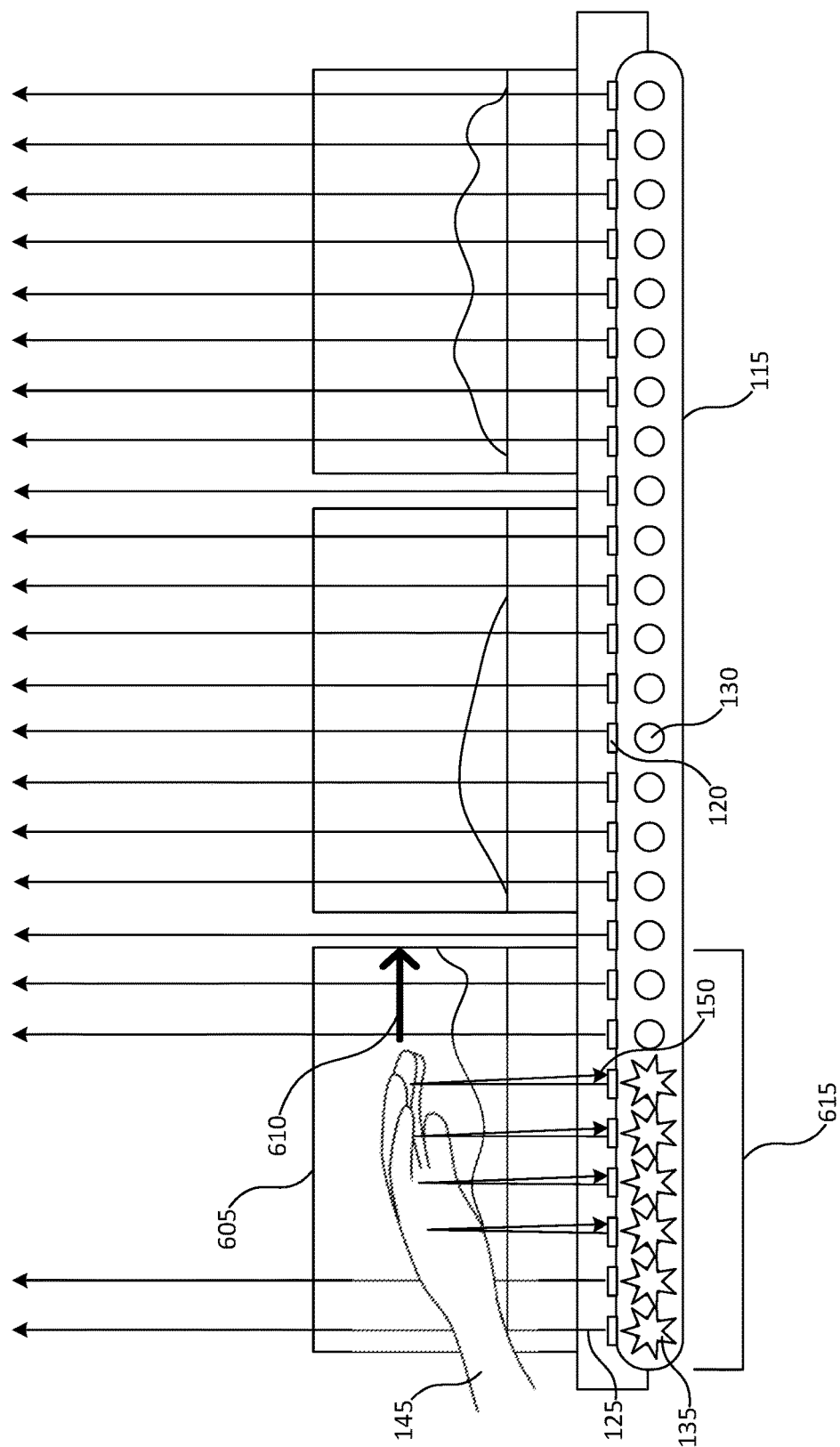
FIG. 6 depicts an exemplary sensor association step in the exemplary reconfigurable detection window generation process.

FIG. 6 depicts an exemplary sensor association step in the exemplary reconfigurable detection window generation process. The illustrated scenario 600 may, for example, correspond to step 520 in the method 500 described in relation to FIG. 5, as applied a portion of the DSVI system 100 described in relation to FIGS. 1-3. The user may, for example, have initiated a training session for one of the containers 110 to generate a corresponding RPDW 110A, such as is described in relation to step 505 of the method 500. A controller (e.g., controller 405 in FIG. 4) activates the first array of distance sensors 120 of DSVI unit 115. Accordingly, the distance sensors emit a corresponding array of electromagnetic signals 125, thereby forming a sensing 'curtain' in a vertical plane, and width detection is initiated (e.g., step 515).

The user moves their hand 145 to penetrate the vertical plane at a point corresponding to an entrance to a first container 605. The user then, in the depicted example, moves their hand 145 left to right as indicated by arrow 610. The user's hand 145 causes the emitted electromagnetic signals 125 to be reflected 150 such that the sensing elements 120 detect motion. In the depicted example, as motion is detected at each sensor 120, a corresponding visual indicator 130 is activated to generate visual indicia 135. The user may thereby, for example, advantageously visualize a width currently determined from the motion of their hand 145. Once the user is finished indicating the width (e.g., step 525), the adjacent sensing elements 120 for which motion was detected may be associated together. Accordingly, a plurality of sensors 120 corresponding to a width 615 of the container 610 may be advantageously associated together with a simple hand motion from the user.

Figure 7:
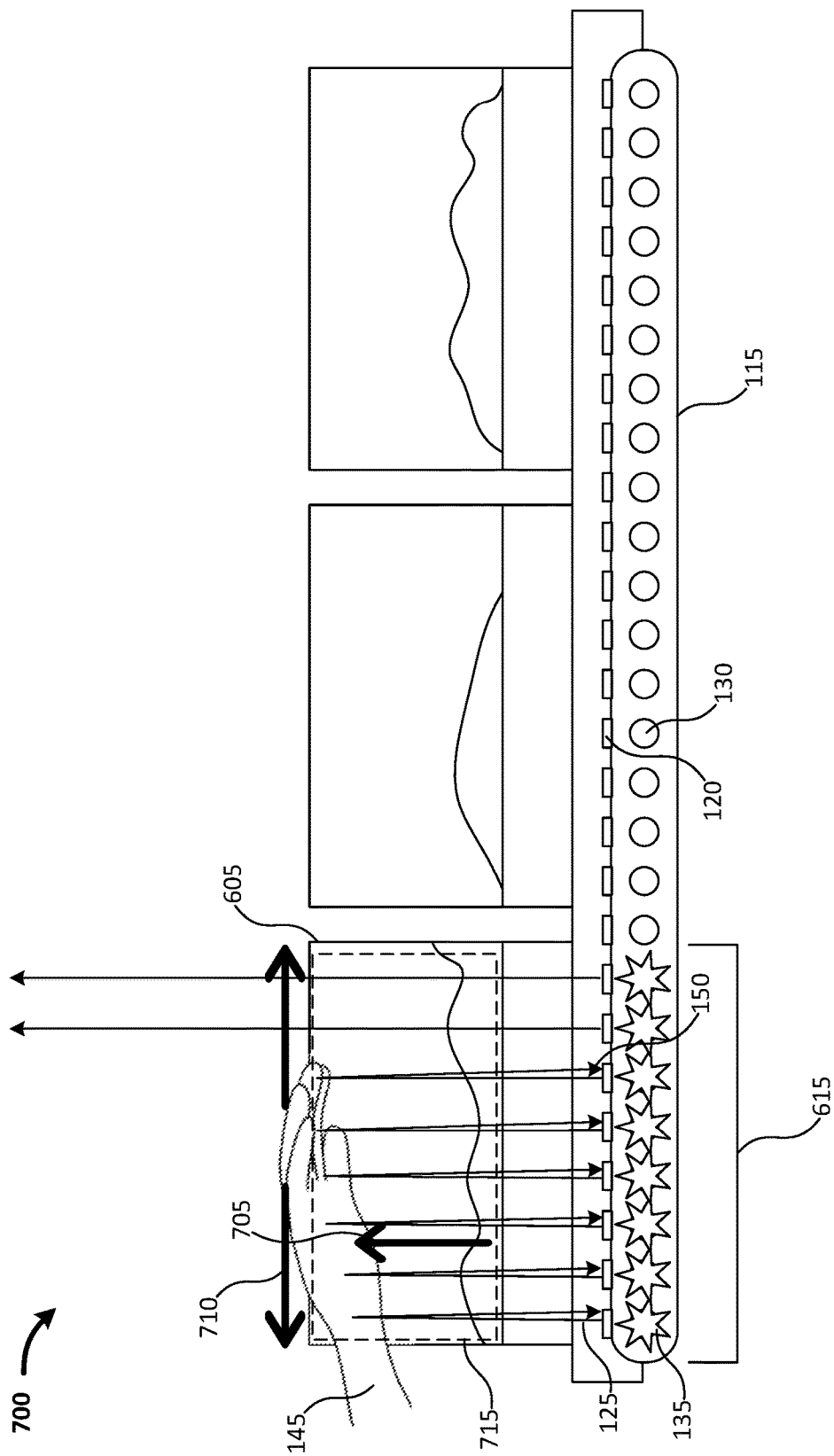
FIG. 7 depicts an exemplary sensor threshold determination step in the exemplary reconfigurable detection window generation process.

FIG. 7 depicts an exemplary sensor threshold determination step in the exemplary reconfigurable detection window generation process. The illustrated scenario 700 may, for example, correspond to step 540 of the method 500 described in relation to FIG. 5. Height detection may have been initiated (e.g., step 530) after adjacent sensors were associated (e.g., step 530) as described in relation to FIG. 6. The sensing elements 120 which were associated together in the previous step corresponding to width 615 are activated. As depicted, the visual indicators 130 corresponding to the width 615 are also activated to generate corresponding visual indicia indicating, for example, the width for which a height threshold profile is being determined.

The user inserts their hand 145 into the corresponding sensing 'curtain' which, as depicted extends far beyond the height of the container 605. The user then moves their hand upwards 705 to the top of an opening of the container 605, and then side to side 710 the width of the bin. In various implementations, motion within the sensing curtain may be omitted, and a simple penetration of the sensing curtain at one or more desired points may be performed.

Accordingly, the user's hand causes reflections 150. The corresponding sensing elements 120 detect the reflections 150 and determine motion therefrom. Once the height detection is completed (e.g., step 545) a distance threshold profile is determined (e.g., step 550). For example, a maximum detected height of the user's hand while penetrating the sensing curtain may be set as an outer boundary threshold. A minimum height of the user's hand while penetrating the sensing curtain may be set as an inner boundary threshold. Accordingly, a finite RPDW 715 corresponding to the width 615 and a height of an opening of the container 605 may be efficiently generated using quick and simple gestures from the user's hand 145.

Although various embodiments have been described with reference to the figures, other embodiments are possible. For example, although sensing elements (e.g., sensing elements 120 of FIGS. 1-3 and 6-7) have been generally described in relation to integrated elements capable of both emitting and detecting of electromagnetic signals, various embodiments may implement separate emission and detection elements. Sensing elements may be implemented, for example as adjacent emitting and receiving elements.

Furthermore, although embodiments have been generally described in relation to detection of reflected signals, other implementations are possible. By way of example and not limitation, an array of receiving sensing elements may be positioned at one location (e.g., on an upper shelf or other surface, such as corresponding to a top of a bin) and an array of emitting sensing elements may be positioned at another location (e.g., on a lower shelf, such as corresponding to a bottom of a bin). Penetration of a resulting sensing curtain may, for example, be detected by failure of a receiving sensing element to receive an emitted signal from an emitting sensing element.

In various embodiments, sensing elements may be configured to detect other than distance. For example, although embodiments have been generally described in relation to distance sensing, association of adjacent sensors may, by way of example and not limitation, be determined by touch sensing, light sensing, force sensing, other appropriate input, or some combination thereof. In various embodiments, distance threshold profile determination steps may be omitted. In various embodiments, distance threshold profile determination steps may be replaced with value threshold determination steps (e.g., force intensity, touch intensity, light intensity) appropriate for the sensing elements implemented.

In various embodiments, teaching operations (e.g., as described in relation to method 500 and FIGS. 5-7) may further be used to set a sequence of operations. For example, a DSVI system (e.g., DSVI system 100) may be provided including a plurality of generic DSVI units (e.g., DSVI units 115). The DSVI units may be mounted, for example, on shelving on which is disposed a plurality of bins which should be accessed by a user in a particular order. A user may initiate a teaching session and sequentially configure RPDWs (e.g., by performing at least steps 515 through 555 of the method 500) corresponding to each bin. The user may sequentially configure the RPDWs in the order in which the bins should be accessed by a user (e.g., for a predetermined assembly sequence or order picking sequence). Predetermined visual indicia may, for example, be associated with each step. The visual indicia may be, for example, determined during configuration of each RPDW or at another time.

In various embodiments, the user may, for example, configure RPDWs in any desired order (e.g., left-to-right, top-to-bottom). The RPDWs may then subsequently be arranged in one or more predetermined sequences. For example, a user may be provided with an interactive user interface (UI) for determining a sequence. In various embodiments, a user may generate a predetermined sequence of activation corresponding to existing RPDWs by activating a teaching session with the existing RPDWs and penetrating each RPDW in a desired sequence.

In various embodiments, RPDWs may be associated with specific items (e.g., contents of corresponding containers) and predetermined sequences may, for example, be dynamically determined. For example, an order may be received for 3 of a first part in a first container corresponding to a first RPDW and 2 of a second part in a second container corresponding to a second RPDW. A dynamic sequence generation engine may, for example, process the order and associate the first RPDW with corresponding visual indicia such as, for example, 3 distinct lights underneath the first container or 3 flashes. The dynamic sequence generation engine may further associate the second RPDW with corresponding visual indicia such as, for example, an indication of a quantity of 2. One or more controllers may receive the dynamically predetermined sequence from the dynamic sequence generation engine and operate the associated DSVI units, including the associated sensing elements and visual indicators, accordingly. Various embodiments may, thus, for example, advantageously be dynamically and nearly instantly reconfigure a predetermined sequence of RPDWs to advantageously guide a user(s) in interacting with associated physical spaces.

In various embodiments, teaching may be performed remotely without direct physical interaction with the distance sensors. For example, a user may configure RPDWs via code input, via a graphical UI (GUI), or some combination thereof. A user, for example, may be provided with a dynamic GUI with a representation of a physical layout of one or more generic DSVI units. The user may, for example, associated adjacent sensors such as, for example, by indicating widths and corresponding height threshold profiles via the GUI. Accordingly, RPDWs may, by way of example and not limitation, advantageously be pre-configured remotely.

In various embodiments, configuration of RPDWs may be performed by first determining a plurality of distinct associations of adjacent sensing elements, and then determining corresponding distance threshold profiles. For example, a user may first perform width detection for a plurality of spaces (e.g., containers), and then perform height detection for the plurality of spaces, rather than performing first height and then width detection sequentially for each space. In various embodiments, a single width and/or single distance threshold profile may be applied repeatedly such as, for example, for a plurality of equally sized and/or equally spaced containers. In various embodiments, RPDW(s) may be stored for application to one or more DSVI units and/or DSVI system configurations.

In various embodiments, RPDWs may be configured for other than height and width. A DSVI unit, by way of example and not limitation, may be configured to detect penetration in a horizontal plane, a plane at a desired angle relative to a particular surface, or some combination thereof. Width detection (e.g., steps 515 through 530 of the method 500) may correspond in a particular implementation to height, or to a different orientation altogether. Similarly, height detection (e.g., steps 535 through 550 of the method 500) may correspond in a particular implementation to width, or to a different orientation altogether. For example, in various embodiments, a DSVI may be configured with 2D and/or 3D arrays of sensing elements and/or visual indicia. Accordingly, width detection may actually correspond, by way of example and not limitation, to a 2D area detection.

In various embodiments, RPDWs may be generated without the use of motion or of a moving object. By way of example and not limitation, in a teaching mode, a distance threshold profile may, for example, be determined based on detection of a static object (e.g., a ledge, an upper shelf). For example, a sensing plane may be oriented such that the plane passes through a front edge of an upper shelf. Accordingly, a distance threshold profile may be generated according to the distance to the shelf. In various embodiments, the RPDW may, for example, be generated according to explicitly defined user parameters such as, by way of example and not limitation, a distance or distance range from a sensing element.

In various embodiments, such as is depicted in FIGS. 2-3B, a number of sensing elements and a number of visual indicators are not equal. For example, various embodiments may include more, less, or a same number of visual indicators as corresponding sensing elements in a given DSVI unit. In various embodiments, for example, an array of visual indicators and an array of sensing elements may be physically separable such as, for example, mounted on mechanically independent surfaces.

Although an exemplary system 100 has been described with reference to FIG. 1, other implementations may be deployed in other industrial, scientific, medical, commercial, and/or residential applications. In various embodiments, DSVI units (e.g., generic DSVI units 115 of FIGS. 1-3 and 6-7) may be implemented, for example, in various use-case scenarios. By way of example and not limitation, DSVI units may be implemented, for example, for jam detection, for safety interlocking, for presence detection, other appropriate use-case employing sensing and indicating, or some combination thereof.

In various embodiments, some bypass circuits implementations may be controlled in response to signals from analog or digital components, which may be discrete, integrated, or a combination of each. Some embodiments may include programmed and/or programmable devices (e.g., PLAs, PLDs, ASICs, microcontroller, microprocessor), and may include one or more data stores (e.g., cell, register, block, page) that provide single or multi-level digital data storage capability, and which may be volatile and/or non-volatile. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Temporary auxiliary energy inputs may be received, for example, from chargeable or single use batteries, which may enable use in portable or remote applications. Some embodiments may operate with other DC voltage sources, such as a 9V (nominal) batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although an example of a system, which may be portable, has been described with reference to the above figures, other implementations may be deployed in other processing applications, such as desktop and networked environments.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various embodiments. For example, various implementations may include digital and/or analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

In some implementations, each system 100 may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system 100 may communicate using suitable communication methods, equipment, and techniques. For example, the system 100 may communicate with compatible devices (e.g., devices capable of transferring data to and/or from the system 100) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits and/or other modules. In various examples, the modules may include analog and/or digital logic, discrete components, traces and/or memory circuits fabricated on a silicon substrate including various integrated circuits (e.g., FPGAs, ASICs). In some embodiments, the module(s) may involve execution of preprogrammed instructions and/or software executed by a processor. For example, various modules may involve both hardware and software.

In one exemplary aspect an indication and sensing system may include: a first array including a first plurality of individually readable distance sensors configured to be disposed along at least a first axis of a platform, wherein each of the first plurality of distance sensors may be configurable to detect penetration of a first plane containing the first axis; a second array including a plurality of individually controllable light emitting indicators disposed along at least a second axis parallel to the first axis; and, a control circuit configured to generate a reconfigurable predetermined detection window by associating together from the first plurality of distance sensors a plurality of adjacent distance sensors detecting the penetration of the first plane during a teaching operation. Each of the first plurality of indicators in the array of indicators may be configurable to emit visual indicia to a user out of the first plane, and the visual indicia may be associated with the detected penetration.

The control circuit may be configured to generate the reconfigurable predetermined detection window by determining at least one distance threshold parameter associated with the plurality of adjacent distance sensors as a function of a maximum distance of a moving object detected by the plurality of adjacent distance sensors during the teaching operation. The control circuit may be configured to generate the reconfigurable predetermined detection window according to a first predetermined maximum distance such that each of the plurality of adjacent distance sensors is configured to only detect the penetration within the first predetermined maximum distance. The control circuit may be further configured to generate the reconfigurable predetermined detection window according to a second predetermined minimum distance such that each of the plurality of adjacent distance sensors is configured to only detect the penetration between the first predetermined maximum distance and the second predetermined minimum distance.

The first plane may be substantially perpendicular to a plane defined by a surface of the platform on which the first plurality of distance sensors is disposed. The first plurality of distance sensors may be arranged linearly along the first axis.

In one exemplary aspect, an indication and sensing system may include: a first array including a first plurality of individually readable distance sensors configured to be disposed along at least a first axis, wherein each of the first plurality of distance sensors is configurable to detect penetration of a first plane containing the first axis; and, a second array comprising a plurality of individually controllable light emitting indicators disposed along at least a second axis substantially parallel to the first axis. Each of the plurality of indicators may be individually configurable to emit visual indicia to a user out of the first plane, and the visual indicia may be associated with the detected penetration.

The system may include a control circuit configured to generate a reconfigurable predetermined detection window by associating together from the first plurality of distance sensors a plurality of adjacent distance sensors detecting input during a teaching operation. The control circuit may be configured such that the input detected is a function of the penetration of the first plane during a teaching operation. The control circuit may be configured to generate the reconfigurable predetermined detection window by determining at least one distance threshold parameter associated with the plurality of adjacent distance sensors as a function of a maximum distance of a moving object detected by the plurality of adjacent distance sensors during the teaching operation. Each of the first plurality of distance sensors may be individually configurable to detect the penetration of the first plane in a detection window that occurs within a first predetermined maximum distance. Each of the first plurality of distance sensors may be individually configurable to detect penetration of the first plane that occurs between the first predetermined maximum distance and a second predetermined minimum distance. The first plane may be substantially perpendicular to a plane defined by a surface of the platform on which the first plurality of distance sensors is disposed. The first plurality of distance sensors may be arranged linearly along the first axis.

The first axis and the second axis may be colinear. The first plane may be substantially perpendicular to a second plane defined by a surface of the platform on which the distance sensors are disposed. The plurality of indicators may be configured to emit the visual indicia at least in a direction substantially perpendicular to the first plane. A subset of the plurality of indicators may be associated with the plurality of adjacent distance sensors. The subset of the plurality of indicators may be configured to emit predetermined visual indicia in response to penetration of the first plane detected by the plurality of adjacent distance sensors.

In one exemplary aspect, an indication and sensing method may include: provide a first plurality of individually readable distance sensors configured to be disposed in a first array along at least a first axis; configure each of the first plurality of distance sensors to detect penetration of a first plane containing the first axis; provide a plurality of individually controllable light emitting indicators configured to be disposed along at least a second axis substantially parallel to the first axis; and, configure each of the plurality of indicators to emit visual indicia to a user out of the first plane, wherein the visual indicia are associated with the detected penetration. The method may include: initiate a teaching operation; select from the first plurality of distance sensors a plurality of adjacent distance sensors detecting input during the teaching operation; and, generate a reconfigurable predetermined detection window by associating together the plurality of adjacent distance sensors. The method may include: determine at least one distance threshold parameter as a function of a maximum distance of a moving object detected by the plurality of adjacent distance sensors during the teaching operation, wherein generate a reconfigurable predetermined detection window further comprises associating the at least one distance threshold parameter with the plurality of adjacent distance sensors.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An indication and sensing system comprising:
   a first array comprising a first plurality of individually readable distance sensors configured to be disposed along at least a first axis of a platform, wherein each of the first plurality of distance sensors is configurable to detect penetration based on reflection signals received in a first plane containing the first axis;
   a second array comprising a plurality of individually controllable light emitting indicators disposed along at least a second axis parallel to the first axis; and,
   a control circuit configured to generate a reconfigurable predetermined detection window width by associating together from the first plurality of distance sensors a plurality of adjacent distance sensors detecting the reflection signal reflected from an obstacle in the first plane during a teaching operation,
   wherein each of the first plurality of indicators in the second array of indicators is configurable to emit visual indicia to a user out of the first plane, and the visual indicia are associated with the detected penetration.

2. The system of claim 1, wherein the control circuit is further configured to generate the reconfigurable predetermined detection window by determining at least one distance threshold parameter associated with the plurality of adjacent distance sensors as a function of a maximum distance of a moving object detected by the plurality of adjacent distance sensors during the teaching operation.

3. The system of claim 1, wherein the control circuit is further configured to generate the reconfigurable predetermined detection window according to a first predetermined maximum distance such that each of the plurality of adjacent distance sensors is configured to only detect the penetration within the first predetermined maximum distance.

4. The system of claim 3, wherein the control circuit is further configured to generate the reconfigurable predetermined detection window according to a second predetermined minimum distance such that each of the plurality of adjacent distance sensors is configured to only detect the penetration between the first predetermined maximum distance and the second predetermined minimum distance.

5. The system of claim 1, wherein the first plane is substantially perpendicular to a plane defined by a surface of the platform on which the first plurality of distance sensors is disposed.

6. The system of claim 1, wherein the first plurality of distance sensors is arranged linearly along the first axis.

7. An indication and sensing system comprising:
   a first array comprising a first plurality of individually readable distance sensors configured to be disposed along at least a first axis, wherein each of the first plurality of distance sensors is configurable to detect penetration of a first plane containing the first axis; and,
   a second array comprising a plurality of individually controllable light emitting indicators disposed along at least a second axis substantially parallel to the first axis; and,
   a control circuit configured to generate a reconfigurable predetermined detection window comprises:
      a window height determined by a predetermined detection range; and,
      a window width determined by associating together from the first plurality of distance sensors a plurality of adjacent distance sensors detecting input during a teaching operation,
   wherein each of the plurality of indicators is individually configurable to emit visual indicia to a user out of the first plane, and the visual indicia are associated with the detected penetration.

8. The system of claim 7, wherein the control circuit is further configured such that the input detected is a function of the penetration of the first plane during a teaching operation.

9. The system of claim 7, wherein the control circuit is further configured to generate the reconfigurable predetermined detection window by determining at least one distance threshold parameter associated with the plurality of adjacent distance sensors as a function of a maximum distance of a moving object detected by the plurality of adjacent distance sensors during the teaching operation.

10. The system of claim 7, wherein each of the first plurality of distance sensors is individually configurable to detect the penetration of the first plane in a detection window that occurs within a first predetermined maximum distance.

11. The system of claim 10, wherein each of the first plurality of distance sensors is individually configurable to detect penetration of the first plane that occurs between the first predetermined maximum distance and a second predetermined minimum distance.

12. The system of claim 7, wherein the first plane is substantially perpendicular to a plane defined by a surface of a platform on which the first plurality of distance sensors is disposed.

13. The system of claim 7, wherein the first plurality of distance sensors is arranged linearly along the first axis.

14. The system of claim 7, wherein the first axis and the second axis are colinear.

15. The system of claim 7, wherein the plurality of indicators is configured to emit the visual indicia at least in a direction substantially perpendicular to the first plane.

16. The system of claim 7, wherein:
   a subset of the plurality of indicators are associated with the plurality of adjacent distance sensors, and the subset of the plurality of indicators are configured to emit predetermined visual indicia in response to penetration of the first plane detected by the plurality of adjacent distance sensors.

17. An indication and sensing method comprising:
provide a first plurality of individually readable distance sensors configured to be disposed in a first array along at least a first axis;
configure each of the first plurality of distance sensors to detect penetration of a first plane containing the first axis;
provide a plurality of individually controllable light emitting indicators configured to be disposed along at least a second axis substantially parallel to the first axis; and,
configure each of the plurality of indicators to emit visual indicia to a user out of the first plane, wherein the visual indicia are associated with the detected penetration;
initiate a teaching operation;
generate a reconfigurable predetermined detection window height based on a predetermined detection range of the first plurality of distance sensors;
select from the first plurality of distance sensors a plurality of adjacent distance sensors detecting input during the teaching operation; and,
generate a reconfigurable predetermined detection window width by associating together the plurality of adjacent distance sensors.

18. The method of claim 17, further comprising:
determine at least one distance threshold parameter as a function of a maximum distance of a moving object detected by the plurality of adjacent distance sensors during the teaching operation,
wherein generate a reconfigurable predetermined detection window further comprises associating the at least one distance threshold parameter with the plurality of adjacent distance sensors.

* * * * *